(12) United States Patent
Abari et al.

(10) Patent No.: US 10,295,672 B2
(45) Date of Patent: May 21, 2019

(54) SYSTEM AND METHOD TO MEASURE AN ATMOSPHERIC THERMODYNAMIC PROFILE WITH A COMPACT, ALL-FIBER AND EYE-SAFE LIDAR

(71) Applicant: University Corporation for Atmospheric Research, Boulder, CO (US)

(72) Inventors: Farzad Cyrus Foroughi Abari, Boulder, CO (US); Scott M Spuler, Westminster, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 767 days.

(21) Appl. No.: 14/940,884

(22) Filed: Nov. 13, 2015

(65) Prior Publication Data

US 2017/0139047 A1    May 18, 2017

(51) Int. Cl.
*G01C 3/08*    (2006.01)
*G01S 17/95*    (2006.01)
(Continued)

(52) U.S. Cl.
CPC .............. *G01S 17/95* (2013.01); *G01S 7/484* (2013.01); *G01S 7/4815* (2013.01);
(Continued)

(58) Field of Classification Search
CPC .......... G01S 17/95; G01S 17/10; G01S 17/58; G01S 7/4815; G01S 7/4818; G01S 7/484; G01W 1/02
(Continued)

(56) References Cited

U.S. PATENT DOCUMENTS

| 7,081,848 B1* | 7/2006 | Adams .................. G01S 7/2923 342/118 |
| 2007/0015383 A1 | 7/2007 | Varming et al. |
| 2014/0301417 A1* | 10/2014 | Kane ........................ H01S 3/11 372/21 |

FOREIGN PATENT DOCUMENTS

WO    WO 2015/087842    *    6/2015    ............. G01S 17/95

OTHER PUBLICATIONS

Yanning Durand, Jerome Caron, Jean-Loup Bezy, Roland Meynart, Lidar tehcnology pre-developments in support A-SCOPE, the ESA mission to measure CO2 from space, European Government Publication the Living Planet, CLRC XV-Toulouse, Jun. 22-26, 2009.
(Continued)

*Primary Examiner* — Mark Hellner
(74) *Attorney, Agent, or Firm* — The Ollila Law Group LLC

(57) ABSTRACT

A lidar system and method to enable simultaneous accurate and high spatial and temporal resolution measurements of atmospheric temperature, wind, and water vapor. The technology employs a laser (101), a telescope (110), an acousto-optic modulator (105) or an electro-optic modulator (205), a Thulium-doped fiber amplifier (206), and an optical circulator (108) which projects a laser signal into the atmosphere toward a phenomenon to be studied. The laser is reflected or backscattered by the atmospheric phenomena and retrieved by the telescope (110), where the laser is processed by a signal sampler and processor (114) for analysis.

19 Claims, 3 Drawing Sheets

(51) Int. Cl.
  *G01S 17/10* (2006.01)
  *G01S 17/58* (2006.01)
  *G01S 7/481* (2006.01)
  *G01S 7/484* (2006.01)
  *G01W 1/02* (2006.01)

(52) U.S. Cl.
  CPC ............ *G01S 7/4818* (2013.01); *G01S 17/10* (2013.01); *G01S 17/58* (2013.01); *G01W 1/02* (2013.01)

(58) Field of Classification Search
  USPC ........................................................ 356/4.01
  See application file for complete search history.

(56) References Cited

OTHER PUBLICATIONS

Fabien Gibert, Dimitri Edouart, Claire Cénac, Florian Le Mounier, Pierre Flamant,; Advanced 2- μm Ho :YLF transmitter and coherent DIAL for atmospheric CO2 profiling in the boundary layer, LMD/CNRS, Ecole Polytechnique, Palaiseau, France, fabien.gibert#lmd.polytechnique.fr.

F. Gibert, D. Edouart, C. Cénac, F. Le Mounier, A. Dumas, New Advances in 2- μm High-Power Dual-Frequency Single-Mode Q-Switched Ho:YLF Laser for Dial and IPDA Application, ICSO 2014 International Conference on Space Optics, Tenerife, Canary Islands, Spain, Oct. 7-10, Oct. 2014.

Sameh Abdelazim, David Santoro, Mark Arend, Fred Moshary, Sam Ahmed, Development of All-fiber coherent Doppler Lidar system for wind sensing, Electrical Engineering Department, City College of New York, New York, NY 10031, USA.

Timothy S. McComb R. Andrew Sims,Christina C. C. Willis, Pankaj Kadwani, Vikas Sudesh, Lawrence Shah, and Martin Richardson, High-power widely tunable thulium fiber lasers,; Received Aug. 12, 2010; revised Oct. 4, 2010; accepted Oct. 9, 2010;posted Oct. 11, 2010 (Doc. ID 132948); published Nov. 3, 2010.

Guillaume Canat, Julien Le Gouët, Laurent Lombard, Alexandre Bresson, Didier Goular, Agnès Dolfi-Bouteyre, Sophie Duzellier, Denis Boivin, Johan Nilsson, Jayata Sahu, Sylvain Bordais, High Power Pulsed Fiber Laser Development for CO2 Space Based Dial System, International Conference on Space Optics,Tenerife, Canary Islands, Spain, Oct. 7-10, Oct. 2014.

Haiyun Xia, Guoliang Shentu, Mingjia Shangguan, Xiuxiu Xia, Xiaodong Jia, Chong Wang, Jun Zhang, Qiang Zhang, Xiankang Dou, and Jianwei Pan, Long-range micro-pulse aerosol lidar at 1.5 μm with an up-conversion single-photon detector.

* cited by examiner

SYSTEM AND METHOD TO MEASURE AN ATMOSPHERIC THERMODYNAMIC PROFILE WITH A COMPACT, ALL-FIBER AND EYE-SAFE LIDAR

GOVERNMENT LICENSE RIGHTS

The U.S. Government has a paid-up license in this invention and the right in limited circumstances to require the patent owner to license others on reasonable terms as provided for by the terms of Agreement No. M0856145, awarded by a National Science Foundation and National Center for Atmospheric Research cooperative agreement.

TECHNICAL FIELD

The present application is related to the field of active remote sensing in the study of atmospheric temperature in atmospheric research.

BACKGROUND OF THE INVENTION

Remote sensing of atmospheric temperature has become a central topic in meteorology, in the wind energy industry, and in the atmospheric sciences. Most devices currently employed in atmospheric research are unable to measure temperature in the atmospheric boundary layer comprising the lowest 3 km of the atmosphere with sufficient accuracy and vertical resolution. Rotational Raman lidar, can provide accurate, high vertical resolution measurements of temperature, but the technological approach is hindered by being costly, bulky and high maintenance.

Continuous high-resolution observation of atmospheric thermodynamic variables, such as temperature, wind and water vapor, in the lower troposphere is crucial for improved weather forecasting at the mesoscale. Wind energy turbines are highly sensitive to atmospheric temperature profiles, at heights beyond 200 m where wind shear, wind veer, and turbulence induce stratification. Horizontal variations of temperature also influence the flow characterization on a varying terrain. To obtain the horizontal variations, a network of temperature profilers is required, such as but not limited to lidars. These profilers must be relatively small, low-cost, eye-safe, and reliable enough to run continuously for years without requiring maintenance.

Lidars can provide high spatial and temporal resolution monitoring of thermodynamic variables in the atmosphere; the majority of such lidars benefit from the direct detection principle. In these systems sub-micron wavelengths are employed to take advantage of a stronger Rayleigh backscatter, where $\beta \propto \lambda^{-4}$ ($\beta$ is the molecular volume scattering coefficient and $\lambda$ is the wavelength). The transceivers in these systems can also be costly and complicated to design and implement. Lidar systems operating between 400 nm and 1400 nm wavelength region have limiting eye-safety requirements. Eye-safety requirements of systems operating above 1400 nm are much more relaxed and allow more compact and lightweight telescopes and transmitters to be employed.

Currently in the art, rotational Raman lidar, which relies on the presence of presumably well-mixed atmospheric nitrogen molecules, is the only reliable active lidar for high resolution remote sensing of atmospheric temperature. The system is hindered by being costly, bulky and requires high maintenance due to the need for powerful transmitters. Another lidar is differential absorption lidar (DIAL) which can employ temperature sensitive absorption lines of oxygen molecules to measure the temperature. This system suffers from a significat bias without correction from the simultaneous presence of Mie and molecular scattering in the backscatter signal.

Another lidar technique to measure atmospheric temperature uses the temperature dependent width of the Rayleigh molecular backscatter spectrum to derive temperature. The technique requires an optical filter, such as a strongly absorbing atomic gas, to remove the spurious Mie backscatter component. This approach is difficult and has never been successfully demonstrated as a viable option.

Another method for remote sensing of atmospheric temperature measures differential absorption of water vapor and includes measurement of a temperature-sensitive absorption line. This approach relies on the presence of water vapor in the lower troposphere. The method may employ three lines with close proximity where one line corresponds to an offline wavelength for the purposes of calibration and the other two correspond to appropriate water vapor absorption lines where the difference between the ground state energies is significant. Overlap of the appropriate lines with absorption lines from any other gas species will cause interference in the measurement and may cause large measurement errors. The absorption lines should be in the optical spectrum where appropriate laser sources are available.

A widely tunable laser source, an optical parametric oscillator (OPO), in combination with a direct detection principle may be used to measure the atmospheric temperature by relying on three appropriate water vapor lines in 1.7 μm portion of the optical spectrum where the presence of interfering gas species is insignificant. In the past, the shortcomings of this approach included, but are not limited to, the inability to fine tune the laser source, slow laser tuning time resulting in the de-correlation of the backscatter signal, and the slow time response of the liquid-nitrogen-cooled InSb photodetectors limiting the range resolution in a range-gated system. Furthermore, the InSb detectors exhibit excess noise and low quantum efficiency. This methodology has been reported to be only capable of path-integrated measurements of temperature, and therefore do not provide the needed high (vertical) range resolutions.

This present application takes a new approach to measuring atmospheric temperature using three appropriate water vapor lines 1.7 μm, by combining low-cost seed lasers, an optimized Thulium-doped fiber amplifier (TDFA), and coherent detection methods. TDFAs have been extensively used in the vicinity of 1900 nm band. By optimizing the TDFA, it is possible to build amplifiers operating around 1770 nm, and provide a reliable high-resolution range-resolved lidar for remote sensing of atmospheric temperature, as well as measure water vapor, and wind simultaneously. The present application provides a way to build a low-cost, low-maintenance temperature profiler which would be suitable for deployment in a network.

SUMMARY OF THE INVENTION

The present application presents a new system and method for providing a compact, robust, eye-safe, and potentially low-cost system which satisfies the need for high spatial and temporal resolution remote sensing of atmospheric temperature. The system and method also provides atmospheric information such as water vapor density and wind measurements to facilitate atmospheric boundary layer studies with commercial application to wind energy, gas sensing, airport monitoring, civil engineering and temperature fluctuations around bridges and tall buildings.

The present system adopts a three wavelength DIAL measurement idea combined with fiber optic technology and provides a multitude of simultaneous high-resolution measurements. The present application offers the advantage of coaxial transceiver design, which enables the application of a compact telescope. Such a system enables the telescope to be easily integrated into a scanning apparatus to enable a 360 degree scan and 3D profiling. The components required are potentially compact so the system could be not only be deployed as a ground-based system, but, in the future, possibly as an airborne lidar system, or in an unmanned aerial vehicle system.

ASPECTS OF THE INVENTION

In one aspect of the invention, a method to measure an atmospheric thermodynamic profile using lidar comprises:

at least one pulse train laser signal using a master oscillator, lock the frequency of the laser signal using a frequency locking mechanism, interleave the at least one laser to create a single laser beam, split the single laser beam into a laser first portion and a laser second portion, feed the laser first portion into a modulator, route the laser first portion from the modulator into a Thulium-doped fiber amplifier, route the laser first portion from the thulium-doped fiber amplifier into an optical circulator, transmit the laser first portion from a telescope, reflect the laser first portion off of an atmospheric phenomena, collect the reflected laser using a telescope, mix the reflected laser with the laser second portion, detect the mixed signal by a photodetector integrated into the balanced mixer, sample the detected signal, and retrieve at least one parameters of interest from the sampled signal.

Preferably a coherent Doppler lidar is used with the master oscillators.

Preferably the coherent Doppler lidar form is all-fiber pulsed heterodyne.

Preferably the modulator is an acousto-optic modulator.

Preferably the modulator is an electro-optic modulator.

Preferably the interleaving uses sequential interleaved pulses.

Preferably the reflected laser is backscattered.

In another aspect of the invention, a method to measure an atmospheric thermodynamic profile using lidar comprises:

at least one master oscillator to generate at least one pulse train laser, a frequency locking mechanism to measure and lock the at least one pulse train laser frequency, a three by one switch to sequentially interleave the at least one pulse train laser and create a single laser beam, a beam splitter to divide the single laser beam into a laser first portion and a laser second portion, a modulator to receive the laser first portion, a Thulium-doped fiber amplifier to receive the laser first portion from the modulator, an optical circulator to receive the laser first portion from the Thulium-doped fiber amplifier, a transceiver telescope to transmit the laser first portion and to receive the reflected laser, a balanced mixer to receive, combine, and detect the reflected laser and the laser second portion, and a sampling mechanism to receive the detected signal from the mixer and retrieve parameters of interest.

Preferably the all-fiber pulsed heterodyne to facilitate Doppler shift sign detection.

Preferably the modulator is an acousto-optic modulator.

Preferably the modulator is an electro-optic modulator.

Preferably the master oscillator is used with a coherent Doppler lidar.

Preferably the coherent Doppler lidar form is all-fiber pulsed heterodyne.

In another aspect of the invention, a lidar to measure an atmospheric thermodynamic profile comprises:

at least one signal generating oscillator, a switch to combine signals from the at least one signal generating oscillator, a modulator to receive and modulate the combined signal, a Thulium-doped fiber amplifier to amplify the modulated signal, an optical circulator to use the amplified and modulated signal, a transceiver telescope to transmit and receive the amplified and modulated signal from the optical circulator, and a sampling mechanism to sample the received amplified and modulated signal.

Preferably the at least one master oscillator is used with a coherent Doppler lidar all-fiber pulsed heterodyne.

Preferably the modulator is one of an acousto-optic modulator (105) and an electro-optic modulator.

Preferably the signal is a laser beam.

Preferably a photodetector receives the amplified and modulated signal.

Preferably a mirror splits the combined signal into a first signal and a second signal and the second signal is combined with the amplified and modulated signal.

Preferably the second signal is inverted 90 degrees and combined with the amplified and modulated signal.

DETAILED DESCRIPTION OF THE INVENTION

Figure 1:
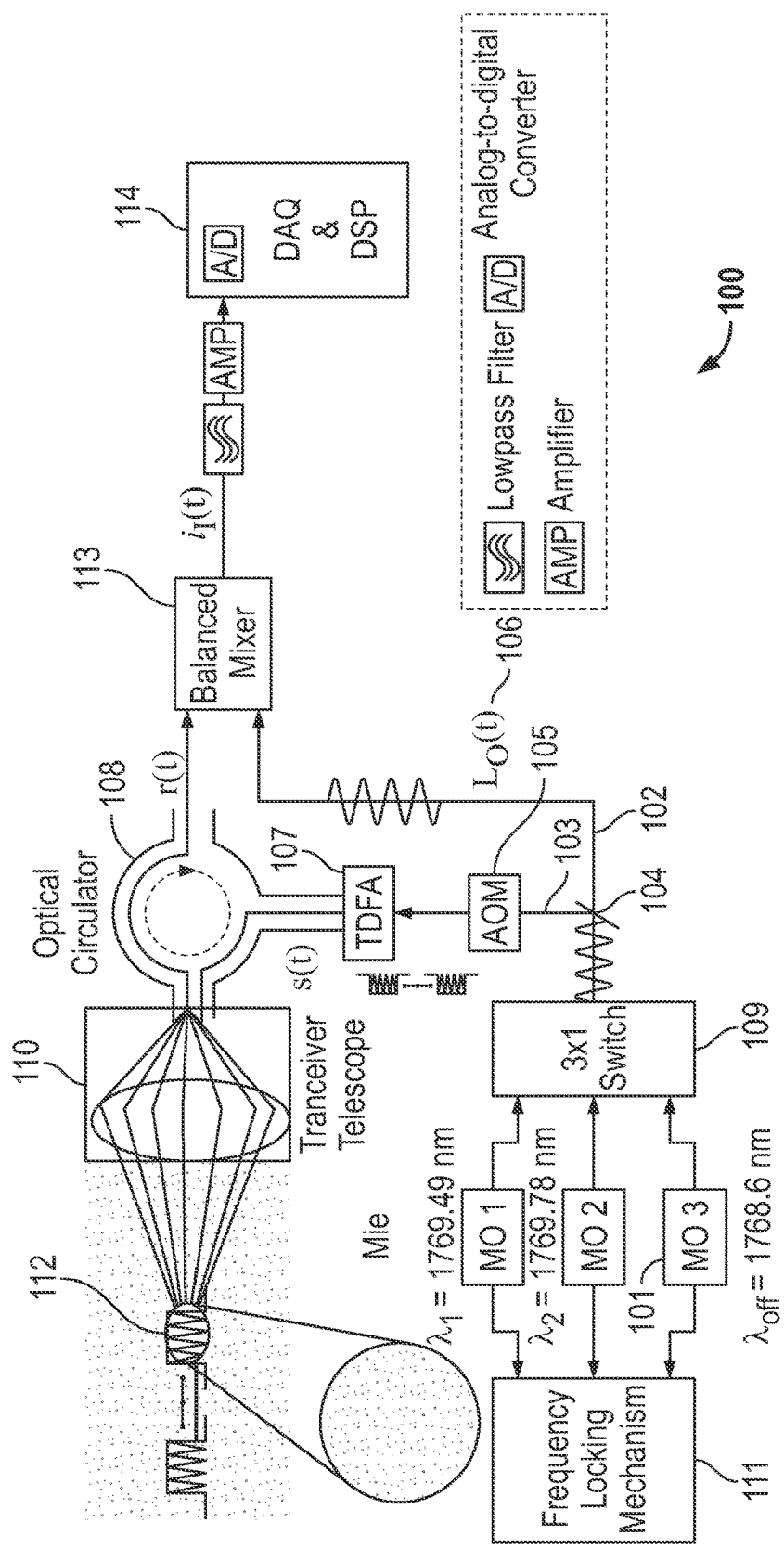
FIG. 1 depicts an embodiment using an acousto-optic modulator.
Figure 2:
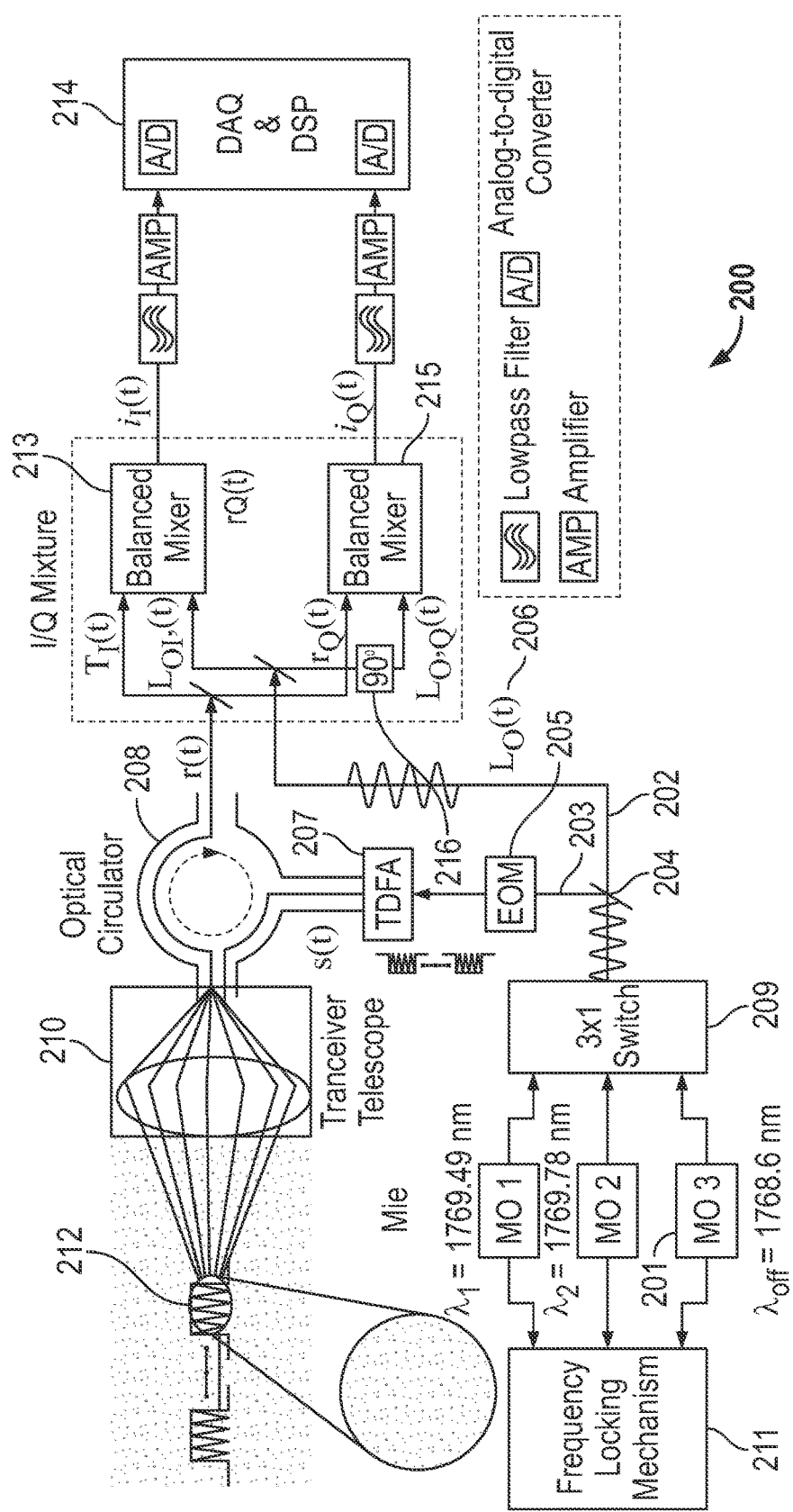
FIG. 2 depicts an embodiment using an electro-optic modulator in combination with an image-reject optical receiver front-end.
Figure 3:
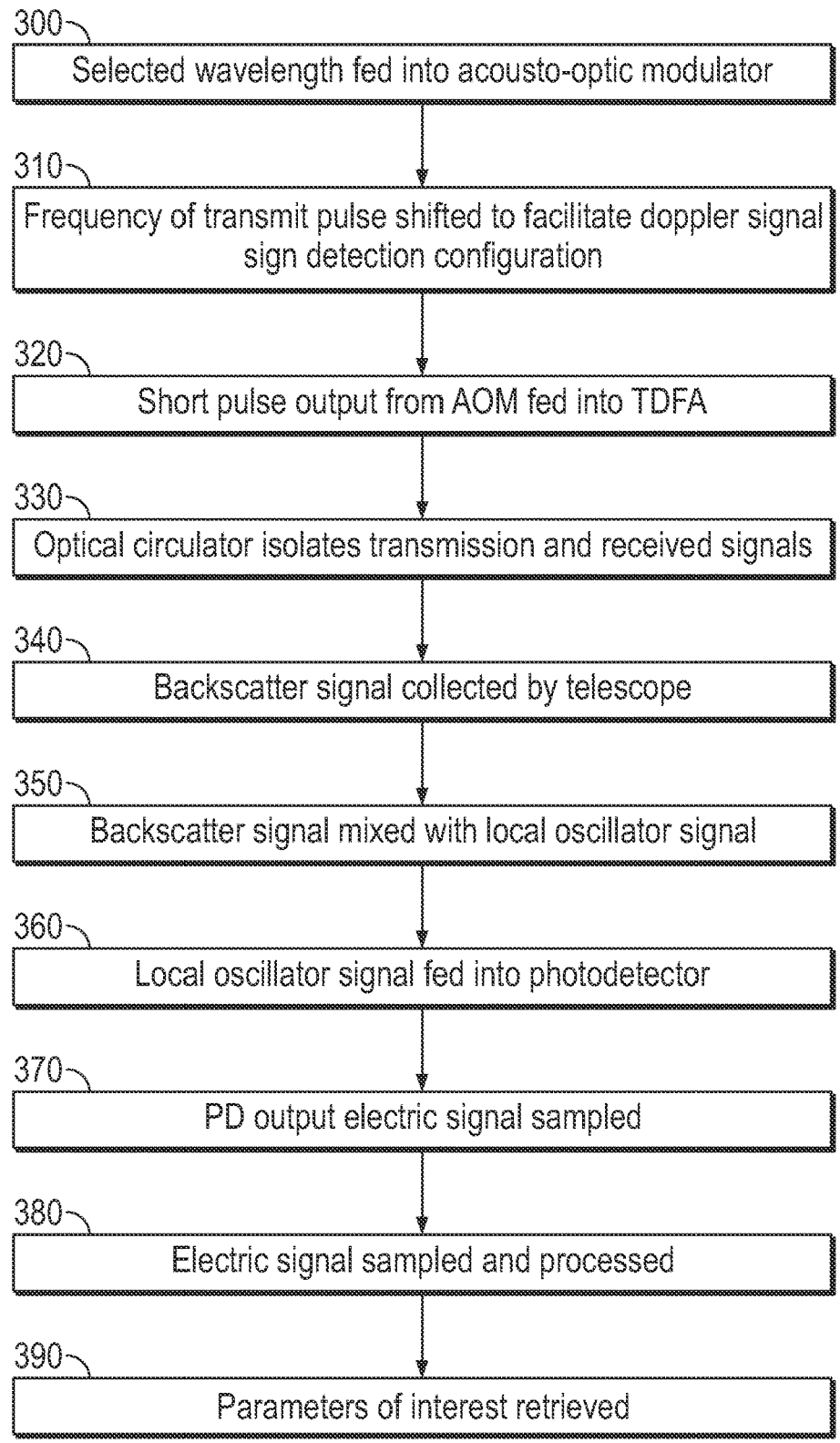
FIG. 3 depicts a flow chart representing the method of the present application.

FIGS. 1-3 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below can be combined in various ways to form multiple variations of the Application. The Application is not limited to the specific examples described below, but only by the claims and their equivalents.

FIG. 1 depicts one embodiment (100) of the system. A form of coherent Doppler lidar (CDL) called an all-fiber pulsed heterodyne CDL along with master oscillators, MO1, MO2, MO3, (101) provide highly stable and narrow linewidth lasers. Each of MO1, MO2, and MO3 (101) generates a separate wavelength laser signal. The frequency locking mechanism (111) serves to measure and lock the laser wavelength with an accuracy of a few MHz.

The embodiment employs three fiber-coupled diodes such as but not limited to distributed feedback (DFB) or distributed Bragg reflector (DBR) lasers, or fiber-based lasers (101) with narrow linewidth characteristics. To minimize the de-correlation effect, the lasers can be switched using sequentially interleaved pulses. The transmitted pulse train may be composed of pulses of alternating wavelengths resulting in less than 1 millisecond correlation time required for a reliable measurement. Three lasers (101) may be combined using a three-by-one fast optical switch (109) to produce a selected wavelength or laser beam.

The selected laser beam is split in two portions (102), (103) by a beam splitter (104). One portion is forwarded as the local oscillator (LO) (106) and the other portion is forwarded as an input signal to an acousto-optic modulator (AOM) (105). The acousto-optic modulator (AOM) (105) not only acts as an amplitude modulator but may also shift the frequency of the laser's transmit pulse in order to facilitate a Doppler signal sign detection configuration. The Doppler configuration is required in order to provide wind measurements. Switches within the AOM (105) may possess rise and fall times of a few tenths of nanosecond. The AOM (105) can be programmed to generate the desired pulse train, which may then be amplified by a Thulium-doped fiber amplifier (TDFA) (107). The short pulse output from the AOM (105) is fed into a TDFA (107) where high-energy pulses on the order of a few hundred µJ are available for further transmission through the optical circulator (108).

The optical circulator (108) is part of a coaxial embodiment, where it isolates the transmission and received signals. The transmitted signal is projected toward the atmospheric phenomena to be studied. A backscatter signal (112) is the portion of the transmitted laser that is reflected from the atmospheric phenomena. The backscatter signal (112) is collected by the telescope (110) and mixed using a balanced mixer (113) with a signal from a local oscillator (LO) (106) where the signal is converted to an electric current using an integrated pair of balanced photodetectors. The mixed signal is sampled by a sampling means (114) and then processed for the retrieval of any parameters of interest.

FIG. 2 presents another embodiment of the system (200) using an all-fiber pulsed image-reject homodyne CDL. The master oscillators, MO1, MO2, MO3, (201) provide highly stable and narrow linewidth lasers. The frequency locking mechanism (211) serves to measure and lock the laser wavelength with an accuracy of a few MHz. Three lasers (101) are combined using a three-by-one fast optical switch (209).

The selected laser is split into two portions (202), (203) by a beam splitter (204), a local oscillator (LO) (206) and input signal to the electro-optic modulator (EOM) (203). The EOM (203) can be programmed to generate the desired pulse train which is amplified by the TDFA (207). The optical circulator (208) isolates the transmitted and received signals. The in-phase/quadrature-phase (I/Q) mixer translates the spectral information into baseband for further processing.

The optical circulator (208) is part of a coaxial embodiment, where it isolates the transmitted and received signals. The optical circulator isolates the transmitted and received signals. The backscatter signal (212) is the portion of the transmitted laser that is reflected from the atmospheric phenomena. The backscatter signal (212) is collected by the telescope (210) and mixed using a balanced mixer (213) with a signal from a local oscillator (LO) (206) where the signal is converted to an electric current using an integrated pair of balanced photodetectors. The mixed signal is sampled by a sampling means (214) and then processed for the retrieval of any parameters of interest.

In this configuration, the AOM (105) of the prior embodiment (100) is replaced by an EOM (205) to provide amplitude modulation. This embodiment (200) also differs from the first embodiment (100) by using a second mixer (215), which combines the backscatter signal (212) collected by the telescope (210) with a 90 degrees out of phase (216) signal from a local oscillator (LO) (206).

An image-reject homodyne receiver is employed to facilitate Doppler shift sign detection. Both the present embodiment and the previous embodiment may employ InGas PDs optimized for long infrared (IR) wavelengths where quantum efficiency close to unity may be achieved. The current embodiment uses coherent detection instead of direct detection (DD). Direct detection may rely on liquid nitrogen cooled in InSb detectors. The CDLs are very sensitive and may achieve a signal-to-noise ratio (SNR) close to unity per unit bandwidth for each received photon. Speckle noise traditionally has been known as a limiting factor in CDLs. The micro-pulse high pulse repetition rate (PRR) system, inherent to fiber amplifiers, proposed herein can significantly reduce the effect of speckle noise through pulse averaging.

In a three wavelength DIAL system, three wavelengths are used to provide measurements. Two lines corresponding to absorption lines of a certain species with comparable absorption cross-sections. For temperature measurement, the two lines should have different ground-state energies. The third wavelength is selected away from the absorption lines and is used to normalize the measurements from the other two lines. The absorbance at range z can be defined as:

$$A_i(T,z)=N(z)z\sigma_i(T,z)=\ln(S_{off})-\ln(S_i)$$

where $S_i$ is the signal power received at $\lambda_i$, N is the density of the species, and $\sigma_i(T,z)$ is the cross-section of the absorbance. For a range resolved measurement where temperature is assumed constant over a single range, the formula $\Delta A_i(T,z)=A_i(T,z+\Delta z)-A_i(T,z)$ provides a differential measurement. Finally, it can be shown that the range-resolved temperature measurement can be estimated by:

$$T=T_0/[1-kT_0/E_1-E_2[\ln(\Delta A_1/\Delta A_2)-(\ln \sigma_1(T_0)/\ln \sigma_2(T_0))]]$$

where $T_0$ is an arbitrary reference temperature and k is the Boltzmann constant. Thus, by estimating the return power through a coherent detection configuration, the atmospheric temperature for a given range can be retrieved.

FIG. 3 represents the method to perform the atmospheric thermodynamic profile with a lidar. A wavelength, such as a laser wavelength is generated by each of at least one master oscillator. The frequencies of the wavelengths are locked using a frequency locking mechanism. The wavelengths may then be interlocked creating a single wavelength. This wavelength may then be split into two portions. One portion of the wavelength is fed into an acousto-optic modulator (300). This may also be an electro-optic modulator in an alternate embodiment. Then a frequency of transmit pulse is shifted to facilitate Doppler signal sign detection configuration (310). Next, a short pulse output from AOM fed into TDFA (320). Then an optical circulator isolates transmission and received signals (330). A backscatter signal is then collected by a telescope (340). The backscatter signal is mixed with a local oscillator signal (350). Then the local oscillator signal fed into photodetector (PD) (360). A PD output electric signal sampled (370) and the electric signal sampled and processed (380). Finally, at least one parameter of interest is then retrieved (390).

In an alternate embodiment, the one portion of the wavelength may be fed into an electro-optic modulator instead of an acousto-optic modulator. The mixing portion of the method may use a second mixer to mix the backscatter signal with a 90 degree inversion of the local oscillator signal.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the Application.

We claim:

1. A method comprising:
generating at least one pulse train laser signal using a master oscillator;
locking the frequency of the at least one pulse train laser signal using a frequency locking mechanism;
interleaving the at least one pulse train laser to create a single laser beam;
splitting the single laser beam into a laser first portion and a laser second portion;
feeding the laser first portion into a modulator;
routing the laser first portion from the modulator into a Thulium-doped fiber amplifier;
routing the laser first portion from the Thulium-doped fiber amplifier into an optical circulator;
transmitting the laser first portion from a telescope;
reflecting the laser first portion off of atmospheric phenomena;
collecting the reflected laser first portion using a telescope;
mixing the reflected laser first portion with the laser second portion and detecting the result by integrated photodetector;
sampling the mixed reflected laser first portion and laser second portion; and
retrieving at least one parameters of interest from the sampled signal.

2. The method of claim 1, wherein a coherent Doppler lidar is used with the master oscillators.

3. The method of claim 2, wherein the coherent Doppler lidar form is all-fiber pulsed heterodyne.

4. The system of claim 1, wherein the modulator is an acousto-optic modulator.

5. The system of claim 1, wherein the modulator is an electro-optic modulator.

6. The method of claim 1, wherein the interleaving uses sequential interleaved pulses.

7. The method of claim 1, wherein the reflected laser is backscattered.

8. A system comprising:
at least one master oscillator (101) to generate at least one pulse train laser beam;
a frequency locking mechanism (111) to measure and lock the at least one pulse train laser beam frequency;
a three by one switch (209) to sequentially interleave the at least one pulse train laser beam and create a single laser beam;
a beam splitter (104) to divide the single laser beam into a laser beam first portion and a laser beam second portion;
a modulator (105) to receive the laser beam first portion;
a Thulium-doped fiber amplifier (107) to receive the laser beam first portion from the modulator;
an optical circulator (108) to receive the laser beam first portion from the thulium-doped fiber amplifier (107);
a transceiver telescope (110) to transmit the laser beam first portion and to receive the reflected laser beam;
at least one photodetector;
a balanced mixer (113) to receive and combine the reflected laser beam first portion and the laser beam second portion and detect a signal through the at least one photodetector; and
a sampling mechanism (114) to receive the combined signal from the mixer (113) and retrieve parameters of interest.

9. The system of claim 8, further comprising an all-fiber pulsed heterodyne to facilitate Doppler shift sign detection.

10. The system of claim 8, wherein the modulator is one of an acousto-optic modulator (105) and an electro-optic modulator (205).

11. The system of claim 8, wherein the at least one photodetector further comprises a pair of integrated balanced photodetectors.

12. The system of claim 8, wherein a coherent Doppler lidar is used with the master oscillator (101).

13. The method of claim 12, wherein the coherent Doppler lidar form is all-fiber pulsed heterodyne.

14. A system comprising:
at least one signal generating oscillator (101);
a switch (109) to combine signals from the at least one signal generating oscillator (101);
a modulator (105) to receive and modulate the combined signal;
a Thulium-doped fiber amplifier (107) to amplify the modulated signal;
an optical circulator (108) to use the amplified and modulated signal;
a transceiver telescope (110) to transmit and receive the amplified and modulated signal from the optical circulator (108); and
a sampling mechanism (114) to sample the received amplified and modulated signal,
wherein a coherent Doppler lidar all-fiber pulsed heterodyne is used with the at least one master oscillator (101).

15. The system of claim 14, wherein the modulator is one of an acousto-optic modulator (105) and an electro-optic modulator (205).

16. The system of claim 14, wherein the signal is a laser beam.

17. The system of claim 14, wherein a photodetector receives the amplified and modulated signal.

18. The system of claim 14, wherein a mirror (104) splits the combined signal into a first signal and a second signal and the second signal is combined with the amplified and modulated signal.

19. The system of claim 18, wherein the second signal is inverted 90 degrees and combined with the amplified and modulated signal.

* * * * *